No. 886,247. PATENTED APR. 28, 1908.
G. H. RECHTENBACH.
GRAIN SCREEN.
APPLICATION FILED APR. 13, 1907.
2 SHEETS—SHEET 1.
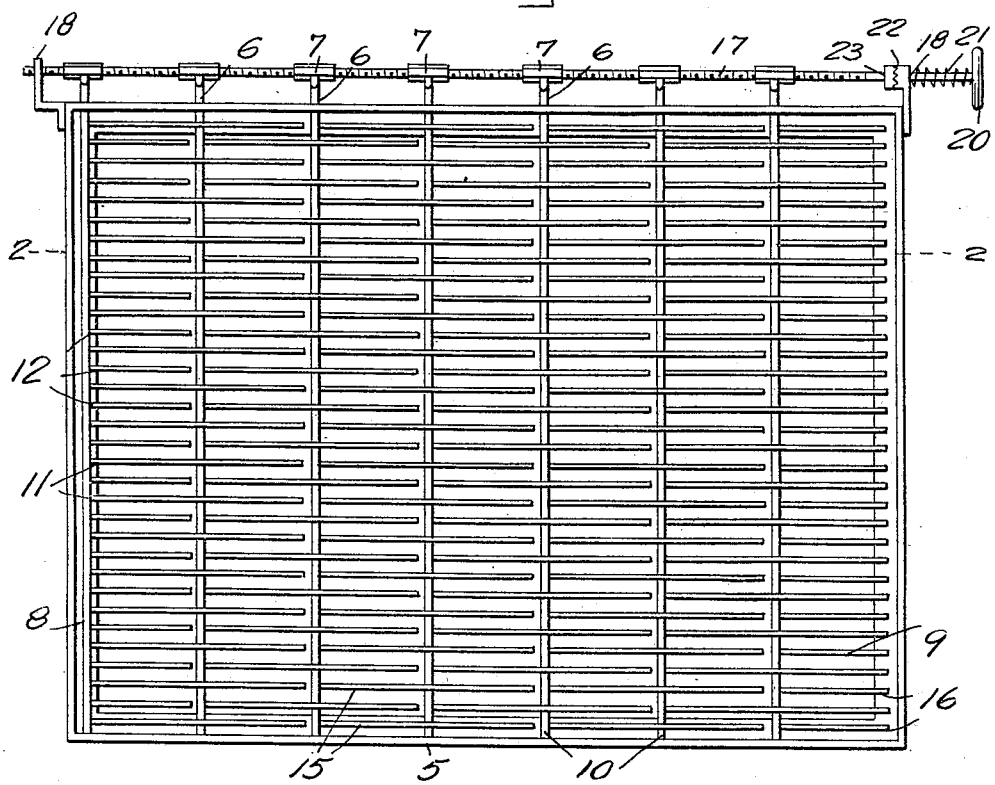
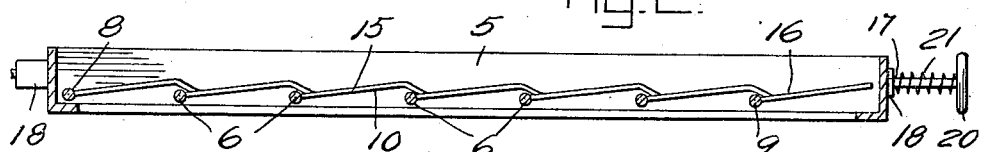
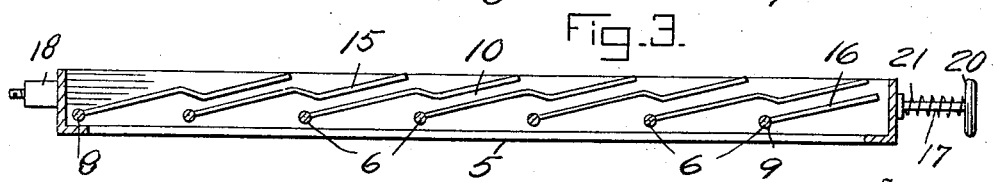
Witnesses
G. R. Thoman
F. C. McCartney
Inventor
G. H. Rechtenbach
By Chandler & Chandler
Attorneys No. 886,247. PATENTED APR. 28, 1908.
G. H. RECHTENBACH.
GRAIN SCREEN.
APPLICATION FILED APR. 13, 1907.
2 SHEETS—SHEET 2.
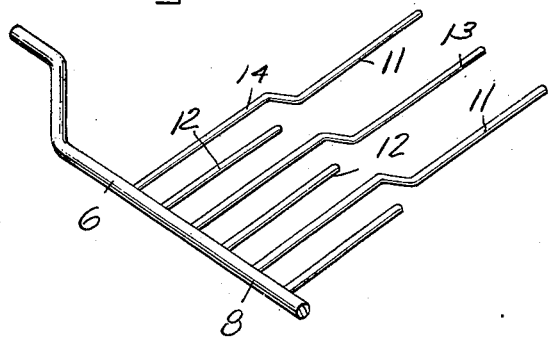
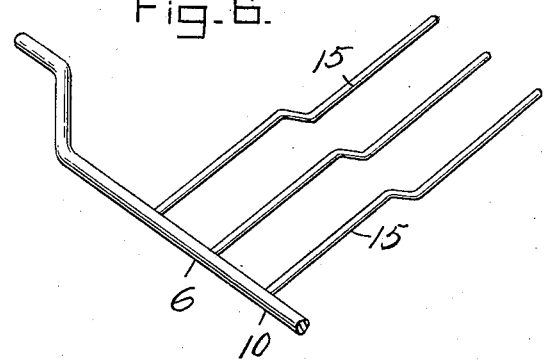
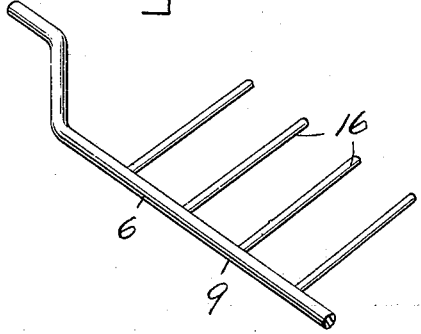
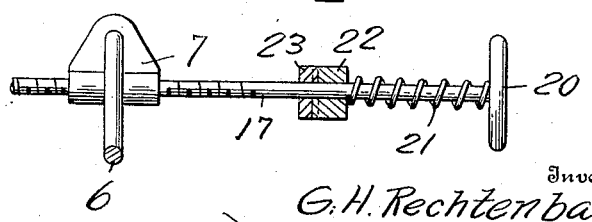
Witnesses
G. R. Thomas
Inventor
G. H. Rechtenbach
By Chandler & Chandler
Attorneys

UNITED STATES PATENT OFFICE.

GEORGE H. RECHTENBACH, OF BRIDGEWATER, IOWA.

GRAIN-SCREEN.

No. 886,247.  Specification of Letters Patent.  Patented April 28, 1908.

Application filed April 13, 1907. Serial No. 368,015.

*To all whom it may concern:*

Be it known that I, GEORGE H. RECHTENBACH, a citizen of the United States, residing at Bridgewater, in the county of Adair, State of Iowa, have invented certain new and useful Improvements in Grain-Screens; and I do hereby declare the following to be a full, clear, and exact description of the invention, such as will enable others skilled in the art to which it appertains to make and use the same.

The present invention relates to improvements in grain screens, and it aims to provide a simple, inexpensive, and highly efficient device of that class consisting of a series of sections each comprising a supporting rod and a series of upwardly and forwardly inclined spaced fingers secured thereto, the fingers being bent intermediate their ends to form front and rear portions disposed in parallel planes, the fingers of adjacent sections being alternately arranged with respect to each other, whereby the front portion of the fingers of each section will be normally between the rear portion of the fingers of the succeeding section, to form a closed bottom for the screen.

The invention further contemplates the provision of a single member connected with all of said sections for operating them simultaneously, to raise or lower said fingers.

With the above and other ends in view, the invention consists in the construction, combination, and arrangement of parts, all as hereinafter fully described, specifically claimed, and illustrated in the accompanying drawings, in which like parts are designated by corresponding reference numerals in the several views.

Of the said drawings—Figure 1 is a plan view of the improved grain screen with the sections in their normal position. Fig. 2 is a longitudinal section taken on the line 2—2 of Fig. 1. Fig. 3 is a similar view showing the sections in their raised position. Fig. 4 is a perspective view of one of the end sections. Fig. 5 is a similar view of the other end section. Fig. 6 is a perspective view of one of the intermediate screen sections. Fig. 7 is a detail view of the operating mechanism for the sections.

In its practical embodiment, the screen includes a rectangular braced frame 5 of any suitable material provided with a series of transverse rods 6, journaled therein and extending therebeyond at one end, as shown, a nut 7 being secured to each rod at such point.

Each rod carries a series of upwardly and forwardly inclined lateral fingers, which are welded thereto at their lower ends and are disposed in spaced relation to each other. The fingers of the left and right hand end sections 8 and 9 differ, however, to some extent, from each other and from those of the intermediate sections 10. The end section 8 carries alternating long and short fingers 11 and 12, respectively, the former being about twice the length of the latter which are bent intermediate their ends to provide the front and rear portions 13 and 14, which are disposed in different parallel planes, as shown in Figs. 2 and 3. The fingers 15 of the intermediate sections 10 are identical in every respect with the long fingers 11 of the end section 8, while the short fingers 12 thereof are similar to the fingers 16 of the end section 9.

The fingers of the adjacent screen sections are, moreover, alternately disposed with respect to each other, so that, generally speaking, the front portions of the fingers of one section lie normally between the rear portion of the fingers of the succeeding section, thus forming approximately a closed bottom for the screen, the short fingers 11 and the rear portions 14 of the long fingers 12 of the end section 8 closing the left-hand end of the screen, while the front portions 13 of the fingers of the forward intermediate section 10 and the short fingers 16 of the end section 9 close the right-hand screen end.

The fingers are preferably formed of wire, and may be of any desired diameter and length, according to the particular use for which the screen is intended.

The frame 5 is further provided upon the side adjacent the projecting rod ends with a threaded shaft 17, whose opposite ends are journaled in brackets 18 secured to the frame side. This shaft passes through the horizontal openings formed in the nuts 7 above referred to, and in addition is provided upon one end with a hand-wheel 20, by means of which it is turned in one direction or the other. It will, therefore, be apparent that when said shaft is rotated in one direction, the several rods will be rocked simultaneously, thus swinging the fingers upwardly a slight distance and opening the screen bottom, rotation of the shaft in the opposite direction moving the fingers back to their normal position, forming, as above stated, a screen bottom which is approximately closed. It will likewise be apparent that the various fingers may be raised to any desired degree to adjust the size of the openings in the screen bottom. The projecting ends of the rods upon which the nuts 7 are disposed are bent upwardly, as shown in Figs. 4, 5 and 6, and the nuts are so arranged thereon that the openings formed therethrough are disposed in alinement with each other, such openings being threaded, as will be obvious, to permit the engagement of the threads of the shaft therewith.

To hold the fingers of the screen section in adjusted position to prevent movement thereof during the actuation of the screen, the shaft 17 is provided with an expansible coil-spring 21, one end of which bears against the hand-wheel 20 and the other end against the adjacent bracket 18, which is enlarged at such point, as indicated by the numeral 22, and forms one member of a clutch, the opposite member 23 of which is carried by said shaft. It will therefore be apparent that rotation of the shaft is impossible until the clutch members 22 and 23 are released from engagement with each other, when the shaft may be turned in either direction.

Further description of the invention is deemed unnecessary as its operation is thought to be sufficiently clear from the foregoing. It is to be understood, however, that in the actual embodiment of the invention, the space between the several fingers carried by the rocking rods is considerably less, proportionately, than that shown in the drawings, in which such space has been greatly exaggerated for clearness of illustration. It is, therefore, correct to say that when the several fingers are in their normal position the screen bottom is closed.

What is claimed, is—

1. The combination, in a grain screen, of a frame; a series of parallel rods journaled therein and projecting therebeyond at one end; a series of spaced, laterally-extending fingers secured at one end to each rod, said fingers being bent intermediate their ends to form front and rear portions disposed in parallel planes, the fingers of adjacent rods being alternately arranged with respect to each other, whereby the front portions of the fingers of one rod lie normally between the rear portions of the fingers of the succeeding rod; a nut secured to the projecting end of each rod and provided with a threaded opening formed horizontally therethrough; a threaded shaft carried by said frame and extending through the threaded openings in said nuts; and means for operating said threaded shaft to rock all of said rods simultaneously and swing said fingers in one direction or the other, in a vertical plane, and open or close the screen bottom.

2. The combination, in a grain screen, of a frame; a series of parallel rods journaled therein and projecting therebeyond at one end; a series of upwardly and forwardly inclined, lateral fingers secured at their lower ends to each of said rods, said fingers being bent intermediate their ends to form front and rear portions disposed in parallel planes, the fingers of adjacent rods being alternately arranged with respect to each other, whereby the front portions of the fingers of one rod lie normally between the rear portions of the fingers of the succeeding rod; a nut secured to the projecting end of each rod and provided with a threaded opening formed horizontally therethrough; a threaded shaft carried by said frame and extending through the threaded opening in said nuts; means for operating said threaded shaft, to rock all of said rods simultaneously and swing said fingers in one direction or the other, in a vertical plane, and open or close the screen bottom; and means for normally holding said shaft against operation.

In testimony whereof, I affix my signature, in presence of two witnesses.

GEORGE H. RECHTENBACH.

Witnesses:
D. N. Dunlap,
T. J. Haagensen.